United States Patent [19]

Mino

[11] Patent Number: 5,155,846
[45] Date of Patent: Oct. 13, 1992

[54] SYSTEM MONITORING REPLIES TO CONTINUOUSLY TRANSMITTED SIGNAL AND DISCONTINUING SIGNAL TO FORCE RESET OF REMOTE SYSTEM USING WATCHDOG TIMER

[76] Inventor: Yoshihito Mino, 4056-1, Nakanogo, Fujikawa-Cho, Ihara-Gun, Shizuoka-Ken, Japan

[21] Appl. No.: 276,390

[22] Filed: Nov. 25, 1988

[30] Foreign Application Priority Data

Nov. 25, 1987 [JP] Japan .................. 62-296681

[51] Int. Cl.⁵ ............................................. G06F 11/34
[52] U.S. Cl. ................... 395/575; 364/267.9; 364/285; 364/264.2; 364/285.3; 364/DIG. 2; 371/16.3
[58] Field of Search ........... 371/16.3, 22.1, 5.1, 371/5.2, 5.3, 5.4, 5.5, 12, 62; 364/200 MS File, 900 MS File

[56] References Cited

U.S. PATENT DOCUMENTS

| | | | |
|---|---|---|---|
| 3,795,800 | 3/1974 | Nimmo | 371/16.3 |
| 3,938,082 | 2/1976 | Schowe | 371/47.1 |
| 4,068,105 | 1/1978 | Jain | 371/11.2 |
| 4,118,792 | 10/1978 | Struger | 371/16.3 |
| 4,131,945 | 12/1978 | Richardson | 364/200 |
| 4,302,841 | 11/1981 | McCulloch | 371/70 |
| 4,313,207 | 1/1982 | Nardozza et al. | 455/1 |
| 4,363,092 | 12/1982 | Abo et al. | 364/200 |
| 4,413,261 | 11/1983 | Greenberg | 340/825.72 |
| 4,468,768 | 8/1984 | Sunkle | 371/16.1 |
| 4,470,882 | 4/1988 | Miller | 364/132 |
| 4,503,686 | 3/1985 | Moizumi | 62/467 |
| 4,531,198 | 7/1985 | Matsuda | 371/12 |
| 4,544,923 | 10/1985 | Blatter | 340/825.69 |
| 4,553,201 | 11/1985 | Pollack | 371/16.1 |
| 4,583,091 | 4/1986 | Sugiura et al. | 340/825.59 |
| 4,610,013 | 9/1986 | Long | 371/16.3 |
| 4,627,060 | 12/1986 | Huang | 371/16.3 |
| 4,629,907 | 12/1986 | Kosak | 371/12 |
| 4,642,633 | 2/1987 | Dunkerton | 340/825.76 |
| 4,670,676 | 1/1987 | Nishitani | 371/12 |
| 4,696,002 | 9/1987 | Schleupen | 371/12 |
| 4,718,020 | 1/1988 | Duich | 364/500 |
| 4,726,024 | 2/1988 | Guziak | 371/16.3 |
| 4,752,930 | 6/1988 | Kitamura | 371/12 |
| 4,759,592 | 7/1988 | Dahnert | 371/16.3 |
| 4,789,924 | 12/1988 | Fukuta | 371/16.2 |
| 4,803,682 | 2/1989 | Hara | 371/16.3 |
| 4,811,200 | 3/1989 | Wagner | 364/200 |
| 4,860,289 | 8/1989 | Coulson | 371/12 |
| 4,879,647 | 11/1989 | Yazawa | 371/16.3 |
| 4,910,658 | 3/1990 | Dudash | 364/188 |
| 4,942,311 | 7/1990 | Harada | 371/12 |
| 4,962,352 | 10/1990 | Ogawa | 371/16.3 |
| 5,031,177 | 7/1991 | Brauninger | 371/16.1 |
| 5,047,708 | 9/1991 | Kondner | 371/16.2 |

*Primary Examiner*—Thomas C. Lee
*Assistant Examiner*—Eric Coleman

[57] ABSTRACT

In a communication control system for transmission of a serial signal between a receiver controller with a microcomputer and a transmitter controller with a microcomputer, if an abnormal condition such as overrun of the receiver microcomputer occurs, or when necessary, a unit within the transmitter controller prevents transmission of control data signals for a predetermined period, and a unit within the receiver controller resets the receiver microcomputer after it has detected that control data signals from the transmitter controller have not been received for a predetermined period.

12 Claims, 3 Drawing Sheets

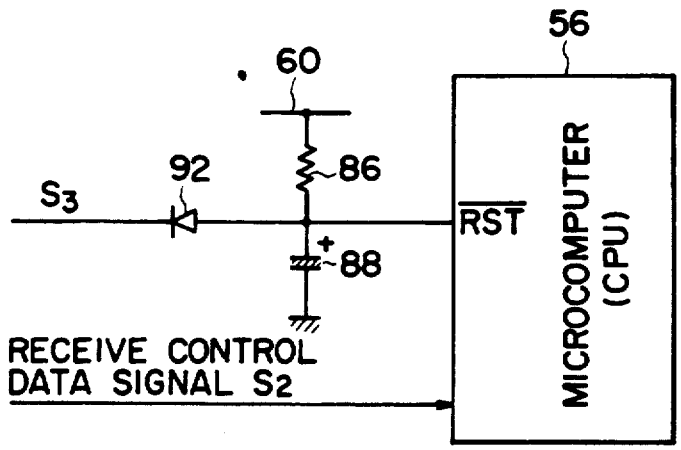
F I G. 4
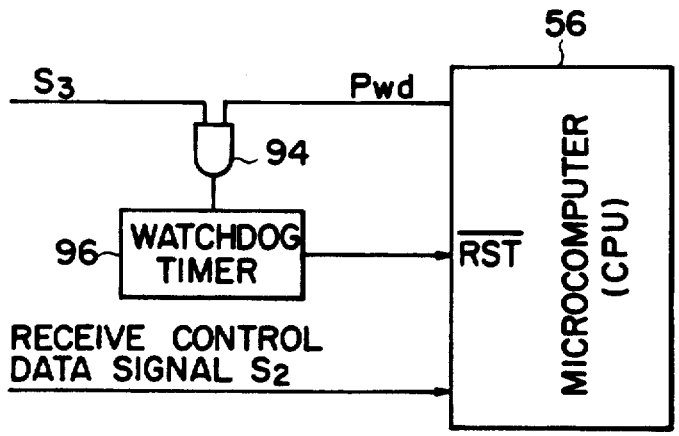
F I G. 5

SYSTEM MONITORING REPLIES TO CONTINUOUSLY TRANSMITTED SIGNAL AND DISCONTINUING SIGNAL TO FORCE RESET OF REMOTE SYSTEM USING WATCHDOG TIMER

BACKGROUND OF THE INVENTION

1. Field of the Art

The present invention relates to a communication control system for transmitting and receiving serial signals between a transmitter controller and a receiver controller.

2. Prior Art

Digital controllers for various types of apparatus used in monitoring, controlling or the like are becoming more common nowadays. In addition, most of such controllers incorporate microcomputers. However, there is a distinct tendency for such apparatus to misoperate because of overrun, erroneous operation or the like of the microcomputers incorporated into such controllers. In communication control systems and those using serial signals for remote control, abnormal operation caused by overrun of the microcomputer on the receiver controller necessitates turning off the power to recover normal operation. To eliminate such disadvantage, an exclusive reset signal line interconnecting a transmitter controller and a receiver controller has been conventionally used to transmit a reset signal from the transmitter controller to the receiver controller, said reset signal line being different from a serial signal line.

A main object of using serial signals is to reduce the number of signal lines between the controllers. However, the use of a dedicated signal line as described above is in conflict with the object of using serial signals.

SUMMARY OF THE INVENTION

It is therefore an object of the present invention to provide a communication control system which allows a transmitter controller to reliably reset a receiver controller, without increasing the number of signal lines between the controllers.

To achieve the above object, the communication control system according to this invention, has a transmitter controller with a microcomputer for generating a control data signal, a receiver controller with a microcomputer for receiving the control data signal and controlling an apparatus in accordance with the receive control data signal, and a communication path for transfer of a serial signal between the transmitter and receiver controllers, and comprises means provided at the transmitter controller for forcibly preventing transmission of the control data signal from the transmitter controller for a predetermined time; and reset means provided at the receiver controller for generating a reset signal if the control data signal from the transmitter controller has not been received for a predetermined period, and resetting the receiver microcomputer in response to the reset signal.

BRIEF DESCRIPTION OF THE DRAWINGS

In the accompanying drawings:

FIG. 4 shows an example of a circuit arrangement at microcomputer; and

FIG. 5 shows a modification of the circuit arrangement shown in FIG. 4.

DETAILED DESCRIPTION OF THE PREFERRED EMBODIMENT

Figure 1:
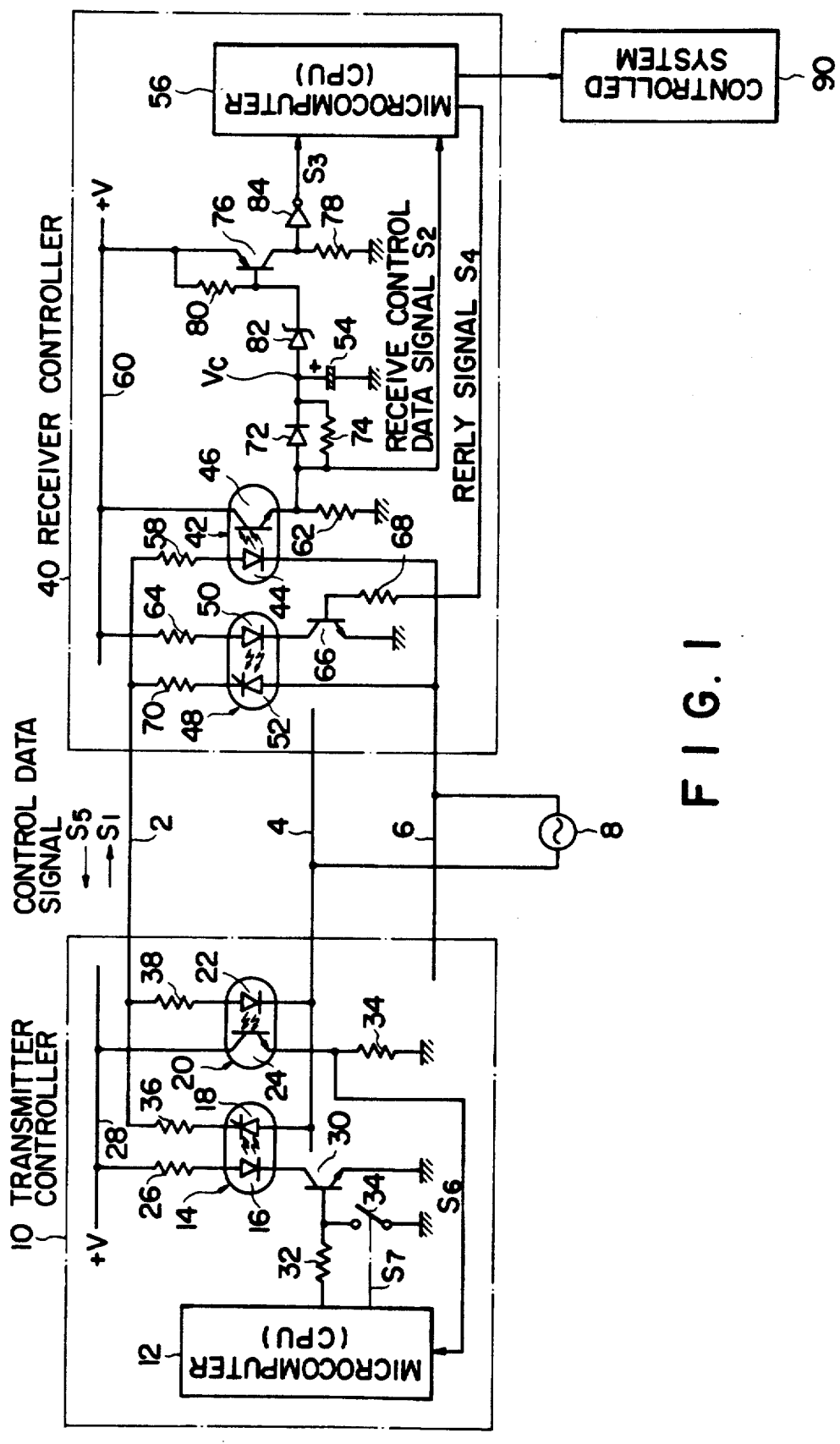
FIG. 1 is a circuit diagram of an embodiment of the communication control system of this invention.

A communication control system as shown in FIG. 1 basically operates in such a manner that a control data signal (serial signal) is transmitted via communication lines 2, 4 and 6 from a transmitter controller 10 to a receiver controller 40 to control a system 90 in accordance with the transmitted control data signal.

The transmitter controller 10 has a microcomputer (CPU) 12, a transmission photocoupler 14 and a reception photocoupler 20. The photocoupler 14 comprises a light emission diode 16 and a photothyristor 18, and the photocoupler 20 comprises a light emission diode 22 and a phototransistor 24. The light emission diode 16 has its anode connected via a resistor 26 to a +V DC power source 28, and its cathode connected via a transistor 30 to ground. The voltage +V of the DC power source 28 is obtained at the transmitter controller 10, using an AC voltage of an AC power source 8 connected to the communication lines 4 and 6. The transistor 30 is controlled to be turned on and off in response to a control data signal generated by CPU 12 through a resistor 32. A switch 34 is provided to short the emitter-base path of the transistor 30. The photothyristor 18 has its cathode connected via a resistor 36 to the communication line 2, and its anode connected to the communication line 4. The light emission diode 22 has its anode connected via a resistor 38 to the communication line 2, and its cathode connected to the communication line 4. The phototransistor 24 has its collector connected to the DC power source 28, and its emitter connected via a resistor 39 to ground. The interconnection between the phototransistor 24 and the resistor 39 is connected to the CPU 12 in order to transmit a reply signal $S_6$. When the reply signal $S_6$ represents an abnormal state, the CPU 12 turns on the switch 34. When necessary, the switch 34 can be manually operated.

The receiver controller 40 has a reception photocoupler 42, a transmission photocoupler 48, a control data disable judging capacitor 54, and a microcomputer (CPU) 56. The photocoupler 42 comprises a light emission diode 44 and a phototransistor 46, and the photocoupler 48 comprises a light emission diode 50 and a photothyristor 52. The light emission diode 44 has its anode connected via a resistor 58 to the communication line 2, and its cathode connected to the communication line 6. The phototransistor 46 has its collector connected to a DC power source 60, and its emitter connected via a resistor to ground. The voltage (+V) of the DC power source 60 is obtained at the receiver controller 40, using an AC voltage across the communication lines 4 and 6. The light emission diode 50 has its anode connected via a resistor 64 to the DC power source 60, and its cathode connected via a transistor 66 to ground. The transistor 66 is controlled to be turned on and off in response to a reply signal $S_4$ generated by CPU 56 through a resistor 68. The photothyristor 52 has its cathode connected via a resistor 70 to the communication line 2 and its anode connected to the communication line 6.

The interconnection between the phototransistor 46 and the resistor 62 is connected to the positive terminal of the capacitor 54 via a parallel circuit made of a diode 72 and a resistor 74, and to the control input terminal of CPU 56 for reception of a receive control data signal $S_2$. The negative terminal of the capacitor 54 is grounded.

A pnp-type transistor 76 is provided between the capacitor 54 and CPU 56. The transistor 76 has its emitter connected to the DC power source 60, and its collector connected via a resistor to ground. The base of the transistor 76 is connected via a resistor 80 to the emitter, and via a Zener diode 82 to the positive terminal of the capacitor 54. The interconnection between the transistor 76 and the resistor 78 is coupled via an inverter 84 to the reset terminal of CPU 56. The system 90 is controlled by CPU 56.

The operation of the communication system shown in FIG. 1 and constructed as above will now be described.

Figure 2:
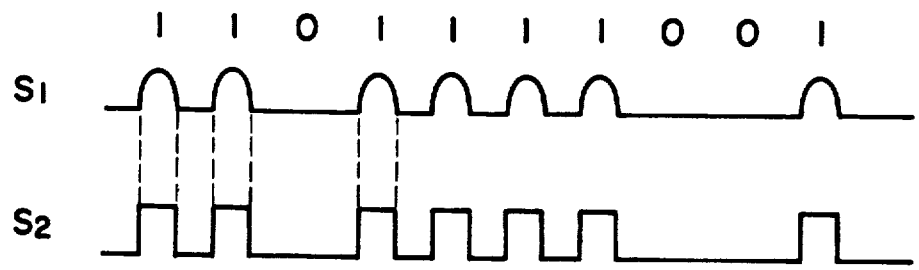
FIG. 2 shows an example of transmitted control data signals and received control data signals.

In the communication control system, the transmission photocoupler 14 of the transmitter controller 10 operates with the reception photocoupler 42 of the receiver controller 40, whereas the transmission photocoupler 48 of the receiver controller 40 operates with the reception photocoupler 20 of the transmitter controller 10. In the transmission mode of the transmitter controller 10, CPU 12 outputs a control data signal to drive the photocoupler 14. The control data signal is then sent during a positive half cycle of the AC power source 8 to a closed loop constructed of, as shown in FIG. 2, the AC power source 8, communication line 4, photothyristor 18, resistor 36 communication line 2, resistor 58, light emission diode 44 and communication line 6, to thereby drive the photocoupler 42 and produce a receive control data signal $S_2$ of shaped waveform across the resistor 62.

In the reception mode of the transmitter controller 10, photocoupler 48 is driven if an reply signal $S_4$ is output from CPU 56. A reply signal $S_5$ is sent during a negative half cycle of the AC power source 8 to a closed loop constructed of the AC power source 8, communication line 6, photothyristor 52, resistor 70, communication line 2, resistor 38, light emission diode 22 and communication line 4, to thereby drive the photocoupler 20 and produce a reply signal $S_6$ of shaped waveform across the resistor 39.

Figure 3:
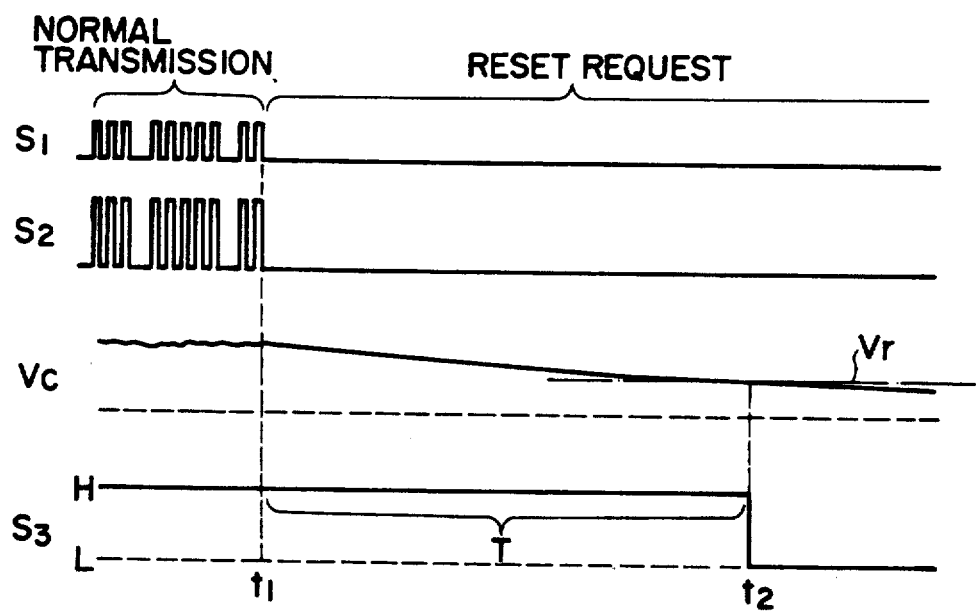
FIG. 3 is a timing chart to be used for explaining the operation of the system shown in FIG. 1.

During the normal transmission operation of the system shown in FIG. 1, the switch 34 is maintained off so that the control data signal from CPU 12 makes the transistor 30 turn on and off. Thus, as shown indicated by "NORMAL TRANSMISSION" in FIG. 3, the control data signal $S_1$ is transmitted from the photocoupler 14 to the photocoupler 42 so that the phototransistor 46 is turned on and off to generate the corresponding receive control signal $S_2$ which charges the capacitor 54. The voltage $V_c$ of the capacitor 54 is charged to approximately the voltage $+V$ of the DC power source 60. CPU 56 receives the control data signal $S_2$, generates the reply signal $S_4$, and controls the system 90 in accordance with the control data signal $S_2$. During such operation, the Zener diode 82 has approximately the same voltage at its both terminals so that it is in off-state. Accordingly, the base current does not flow and the transistor 76 is therefore also in off-state. Thus, a low "L" level signal is input to the inverter 78, the "H" level output signal of which does not reset CPU 56.

Next, the case where an abnormal condition such as overrun or the like of CPU 56 of the receiver controller 40 occurs, will be described.

If CPU 56 overrun occurs at time $t_1$ (FIG. 3), the reply Signal $S_4$ generated by CPU 56 represents an abnormal state. The reply signal $S_4$ turns on the transistor 66 and drive the photocoupler 48. A reply signal $S_5$ corresponding to the reply signal $S_4$ is transmitted to the photocoupler 20 to generate a voltage across the resistor 39. Upon sensing the voltage, CPU 12 detects the abnormal state and outputs a reset request signal $S_7$ to turn on the switch 34. As a result, the transistor 30 is turned off so that the control data signal $S_1$ becomes the "L" level irrespective of presence of "H" level signals, and hence the received control data signal also becomes "L" level. Consequently, the capacitor 54 starts discharging through the resistors 74 and 62 at a given time constant. With this discharge, the capacitor voltage $V_c$ which is the anode voltage of the Zener diode 72 starts gradually lowering (refer to FIG. 3). When the capacitor voltage $V_c$ lowers to a threshold value $V_r$ (at time $t_2$: after time T from time $t_1$) which is defined by the Zener voltage of the Zenor diode 72 and the characteristic of the transistor 76, the transistor 76 is turned on so that an "H" level signal is input to the inverter 84 which outputs an "L" level signal, i.e., a reset signal $S_3$. This "L" level reset signal $S_3$ resets CPU 56, and hence the system 90.

FIG. 4 shows an example of a circuit portion near the input terminal of CPU 56 to which the reset signal $S_3$ from the inverter 84 is supplied. CPU 56 has a terminal to which the control data signal $S_2$ received by the receiver controller 40 is supplied, as well as a reset input terminal $\overline{RST}$. The reset input terminal $\overline{RST}$ is connected via a diode 92 to the output terminal of the inverter 84, and has a resistor 86 connected to the DC power source 60 and a capacitor 88 connected to ground. The capacitor 88 maintains CPU 56 in the reset state until the nominal DC voltage is built up after the power source is turned on. Upon application of an "L" reset signal $S_3$, the capacitor 88 discharges through the diode 92 to reset CPU 56.

As described above, when CPU 56 of the receiver controller 40 stops due to an abnormal condition such as overrun, CPU 56 can be reset from the transmitter controller 10. In the above embodiment shown in FIG. 4, the reset signal $S_3$ is supplied via the diode 92 to the reset input terminal $\overline{RST}$ of CPU 56. FIG. 5 shows another example of the circuit portion near the reset terminal wherein the reset signal $S_3$ is more indirectly applied to CPU 56.

Referring to FIG. 5, the reset signal $S_3$ is applied to the reset input terminal $\overline{RST}$ via an AND gate 94 and a watchdog timer 96. The AND gate 94 is input with the reset signal $S_3$ and a watchdog pulse $P_{wd}$ from CPU 56. CPU 56 outputs watchdog pulses $P_{wd}$ at predetermined time intervals in the normal operation state. As long as the reset signal $S_3$ is of the "H" level, an "H" level signal is maintained to be applied to the reset input terminal $\overline{RST}$ so that CPU 56 is never reset. However, if the reset signal $S_3$ is inverted to the "L" level, the watchdog pulses $P_{wd}$ from CPU 56 are stopped at the AND gate 94 so that the output signal of the watchdog timer 96 inverts into the "L" level and CPU 56 is reset.

What is claimed is:

1. A system, comprising:
   a transmitter controller for remotely controlling a controlled system, comprising:
   a first microcomputer for continuously generating a control data signal;

means for transmitting said control data signal to a remote receiver controller; and means for forcibly preventing transmission of the control data signal from the transmitter controller for a predetermined time to force resetting of a second microcomputer in the receiver controller;

a remote receiver controller for directly controlling said controlled system, comprising:

said second microcomputer for receiving the control data signal and controlling the controlled system in accordance with the control data signal; and reset means for generating a reset signal if the control data signal from the transmitter controller has not been received for a predetermined period, and resetting the second microcomputer in response to the reset signal; and a communication path for transferring the control data signal in the form of a serial signal between the transmitter controller and the receiver controller.

2. A system according to claim 1, wherein said control data signal transmission preventing means comprises a switch which stops the operation of a control data signal transmission transistor.

3. A system according to claim 1, wherein said reset means comprises a capacitor and reset signal generating means, said capacitor being charged by a DC power source having a predetermined voltage while said receiver controller receives the control data signal, and being discharged at a predetermined time constant while said receiver controller does not receive the control data signal.

4. A system according to claim 3, wherein said reset signal generating means comprises a Zener diode which is turned on when the voltage of said capacitor lowers to a predetermined value to drive a reset signal generating transistor.

5. A system according to claim 1, comprising a shunt capacitor connected to a reset signal input terminal of said receiver microcomputer.

6. A system according to claim 1, further comprising an AND gate and a watchdog timer connected between the output of said AND gate and a reset signal input terminal of said receiver microcomputer, said AND gate being input with a watchdog pulse from said receiver microcomputer and with said reset signal.

7. A system, comprising:

a transmitter controller for remotely controlling a controlled system, comprising:

a first microcomputer for continuously generating a control data signal;

means for transmitting said control data signal to a remote receiver controller;

means for receiving a reply signal from the receiver controller and generating a reset request signal if the reply signal indicates an abnormal state; and means for forcibly preventing transmission of the control data signal from the transmitter controller for a predetermined time in response to the reset request signal;

a remote receiver controller for directly controlling said controlled system, comprising:

a second microcomputer for receiving the control data signal and controlling the controlled system in accordance with the control data signal;

means for transmitting a reply signal to the transmitter controller when the control data signal has been received; and reset means for generating a reset signal if the control data signal from the transmitter controller has not been received for a predetermined period, and resetting the second microcomputer in response to the reset signal; and a communication path for transferring the control data signal and the reply signal in the form of serial signals between the transmitter controller and the receiver controller.

8. A system according to claim 7, wherein said control data signal transmission preventing means comprises a switch which stops the operation of a control data signal transmission transistor.

9. A communication control system according to claim 7, wherein said reset means comprises a capacitor and reset signal generating means, said capacitor being charged by a DC power source having a predetermined voltage while said receiver controller receives the control data signal, and being discharged at a predetermined time constant while said receiver controller does not receive the control data signal.

10. A system according to claim 9, wherein said reset signal generating means comprises a Zener diode which is turned on when the voltage of said capacitor lowers to a predetermined value to drive a reset signal generating transistor.

11. A system according to claim 7, comprising a shunt capacitor connected to a reset signal input terminal of said receiver microcomputer.

12. A system according to claim 7, further comprising an AND gate and a watchdog timer connected between the output of said AND gate and a reset signal input terminal of said receiver microcomputer, said AND gate being input with a watchdog pulse from said receiver microcomputer and with said reset signal.

* * * * *